United States Patent
Chidurala et al.

(10) Patent No.: US 9,913,247 B1
(45) Date of Patent: Mar. 6, 2018

(54) SMART SIGNBOARD-BASED NOTIFICATION SYSTEM

(71) Applicant: QUALCOMM Incorporated, San Diego, CA (US)

(72) Inventors: Uday Kumar Chidurala, Karimnagar (IN); Dhananjaya Sarma Ponukumati, Hyderabad (IN); Sumanth Kumar Kota, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/461,457

(22) Filed: Mar. 16, 2017

(51) Int. Cl.
*H04M 1/725* (2006.01)
*H04W 68/00* (2009.01)
*H04W 4/06* (2009.01)
*H04W 4/00* (2018.01)

(52) U.S. Cl.
CPC ......... *H04W 68/005* (2013.01); *H04W 4/008* (2013.01); *H04W 4/06* (2013.01)

(58) Field of Classification Search
USPC ............................ 455/404.1, 414.1, 412.2
See application file for complete search history.

(56) References Cited

U.S. PATENT DOCUMENTS

| | | | |
|---|---|---|---|
| 7,020,701 B1 | 3/2006 | Gelvin et al. | |
| 2007/0214041 A1* | 9/2007 | Patel ..................... | G06Q 30/02 705/14.55 |
| 2008/0109302 A1* | 5/2008 | Salokannel ............ | G06Q 30/02 705/14.1 |

FOREIGN PATENT DOCUMENTS

EP 2165321 A1 3/2010

OTHER PUBLICATIONS

Atallah R.F., et al., "Vehicular Networking: A Survey on Spectrum Access Technologies and Persisting Challenges", Vehicular Communications, vol. 2, No. 3, Mar. 23, 2015, pp. 1-31.
Gerla M., et al., "Vehicular Networks and the Future of the Mobile Internet", Computer Networks, vol. 55, No. 2, Feb. 1, 2011, pp. 1-14.
Hayat K., et al., "GPS based Vehicles Conflict Measure and Dynamic Slot Allocation", Master's Thesis in Computer Systems Engineering, School of Information Science, Computer and Electrical Engineering, Jan. 2007, pp. 1-55.

* cited by examiner

*Primary Examiner* — Joel Ajayi
(74) *Attorney, Agent, or Firm* — Muncy, Geissler, Olds & Lowe, P.C.

(57) ABSTRACT

Disclosed are techniques for notifying a user of a wireless mobile device of the contents of a signboard. In an aspect, the wireless mobile device receives a notification in a broadcast message transmitted on a broadcast channel of a short-range wireless network, the notification representing the contents of the signboard, decodes the notification without connecting to the short-range wireless network, and provides data representing the notification to the user of the wireless mobile device. In an aspect, a wireless access point coupled to the signboard encodes the notification in the broadcast message transmitted on the broadcast channel of the short-range wireless network supported by the wireless access point and broadcasts the notification in the broadcast message transmitted on the broadcast channel of the short-range wireless network.

16 Claims, 7 Drawing Sheets

SMART SIGNBOARD-BASED NOTIFICATION SYSTEM

INTRODUCTION

Aspects of this disclosure relate generally to a "smart" signboard-based notification system.

In daily life, signboards in public places (e.g., roadside signs, warning signs, informational signs, etc.) often go unnoticed for various reasons. For example, when a user is using their mobile device while walking or driving, the user may overlook warning signs, which can result in an accident or an injury. Existing signboards do not proactively alert the user in such scenarios.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of notifying a user of a wireless mobile device of contents of a signboard includes receiving, at the wireless mobile device, a notification in a broadcast message transmitted on a broadcast channel of a short-range wireless network, the notification representing the contents of the signboard, decoding, by the wireless mobile device, the notification in the broadcast message transmitted on the broadcast channel of the short-range wireless network without connecting to the short-range wireless network, and providing, by the wireless mobile device, data representing the notification to the user of the wireless mobile device.

In an aspect, a method of notifying a wireless mobile device of contents of a signboard includes encoding, by a wireless access point coupled to the signboard, a notification in a broadcast message to be transmitted on a broadcast channel of a short-range wireless network supported by the wireless access point, the notification representing the contents of the signboard, and broadcasting, by the wireless access point, the notification in the broadcast message on the broadcast channel of the short-range wireless network, wherein the notification being broadcast in the broadcast message transmitted on the broadcast channel of the short-range wireless network enables a wireless mobile device to decode the notification without connecting to the short-range wireless network.

In an aspect, an apparatus for notifying a user of a wireless mobile device of contents of a signboard includes a transceiver of the wireless mobile device configured to receive a notification in a broadcast message transmitted on a broadcast channel of a short-range wireless network, the notification representing the contents of the signboard, at least one processor of the wireless mobile device configured to decode the notification in the broadcast message transmitted on the broadcast channel of the short-range wireless network without connecting to the short-range wireless network, and a user interface of the wireless mobile device configured to provide data representing the notification to the user of the wireless mobile device.

In an aspect, an apparatus for notifying a wireless mobile device of contents of a signboard includes at least one processor of a wireless access point coupled to the signboard configured to encode a notification in a broadcast message to be transmitted on a broadcast channel of a short-range wireless network supported by the wireless access point, the notification representing the contents of the signboard, and a transceiver of the wireless access point configured to broadcast the notification in the broadcast message on the broadcast channel of the short-range wireless network, wherein the notification being broadcast in the broadcast message transmitted on the broadcast channel of the short-range wireless network enables a wireless mobile device to decode the notification without connecting to the short-range wireless network.

In an aspect, a non-transitory computer-readable medium includes computer-executable instructions comprising at least one instruction to cause a wireless mobile device to receive a notification in a broadcast message transmitted on a broadcast channel of a short-range wireless network, the notification representing the contents of the signboard, at least one instruction to cause the wireless mobile device to decode the notification in the broadcast message transmitted on the broadcast channel of the short-range wireless network without connecting to the short-range wireless network, and at least one instruction to cause the wireless mobile device to provide data representing the notification to the user of the wireless mobile device.

In an aspect, a non-transitory computer-readable medium includes computer-executable instructions comprising at least one instruction to cause a wireless access point coupled to a signboard to encode a notification in a broadcast message to be transmitted on a broadcast channel of a short-range wireless network supported by the wireless access point, the notification representing the contents of the signboard, and at least one instruction to cause the access point to broadcast the notification in the broadcast message on the broadcast channel of the short-range wireless network, wherein the notification being broadcast in the broadcast message transmitted on the broadcast channel of the short-range wireless network enables a wireless mobile device to decode the notification without connecting to the short-range wireless network.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
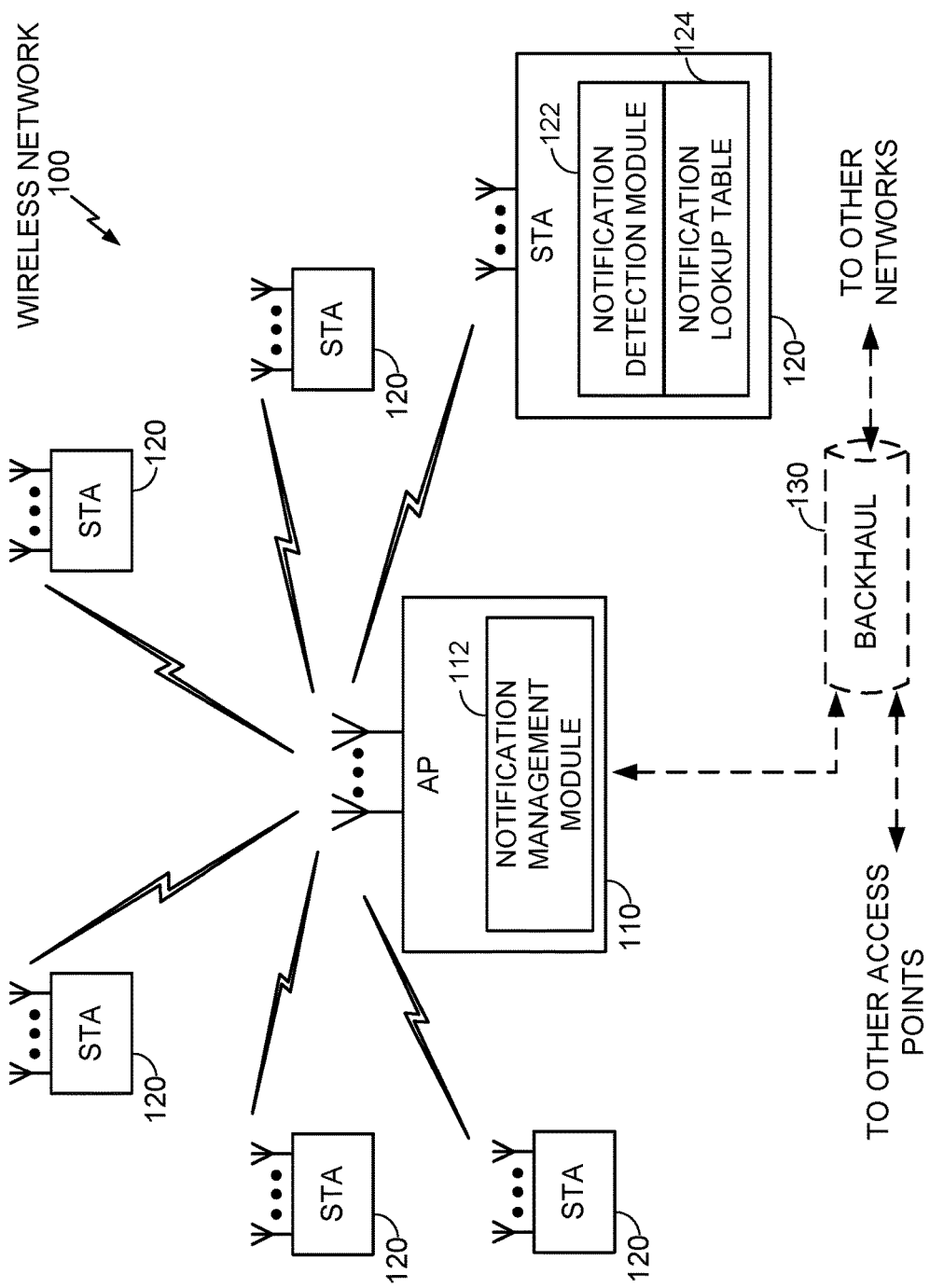
FIG. 1 illustrates an example wireless network employing a short-range wireless network protocol.

The present disclosure relates generally to notifying a user of a wireless mobile device of contents of a signboard. In an aspect, the wireless mobile device receives a notification in a broadcast message transmitted on a broadcast channel of a short-range wireless network, the notification representing the contents of the signboard, decodes the notification without connecting to the short-range wireless network, and provides data representing the notification to the user of the wireless mobile device. In an aspect, a wireless access point coupled to the signboard encodes the notification in the broadcast message transmitted on the broadcast channel of the short-range wireless network supported by the wireless access point and broadcasts the notification in the broadcast message transmitted on the broadcast channel of the short-range wireless network.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

As noted above, signboards in public places (e.g., roadside signs, warning signs, informational signs, etc.), or at least the content printed on such signboards, often go unnoticed for various reasons. For example, when a user is using their mobile device while walking or driving, the user may overlook warning signs, which can result in an accident or an injury. Existing signboards do not proactively alert the user in such scenarios. As such, the present disclosure provides a system in which signboards are configured as wireless access points to broadcast warning messages or other notifications over a short-range wireless network that uses unlicensed spectrum, such as Wi-Fi, Long-Term Evolution (LTE) Direct, Bluetooth®, ZigBee®, and the like.

FIG. 1 illustrates an example wireless network 100 in which the system of the present disclosure can be practiced. As shown, the wireless network 100, which may also be referred to herein as a Basic Service Set (BSS), is formed from several wireless nodes, including an Access Point (AP) 110 coupled to a signboard (referred to herein as a "signboard access point" or a "signboard AP"), and a plurality of subscriber stations (STAs) 120. The wireless network 100 is a multiple-access system in which multiple STAs 120 share available system resources (e.g., bandwidth, transmit power, etc.) in order to communicate with the signboard AP 110. Each wireless node is generally capable of receiving and/or transmitting within the wireless network 100. More specifically, each STA 120 communicates with the signboard AP 110 via transmissions on the downlink and the uplink. The downlink (DL) refers to the communication link from the signboard AP 110 to the STAs 120, and the uplink (UL) refers to the communication link from the STAs 120 to the signboard AP 110.

The wireless network 100 may support any number of signboard APs 110 distributed throughout a geographic region to provide notifications and other information to the STAs 120. However, for simplicity, one signboard AP 110 is shown in FIG. 1. In an aspect, the signboard AP 110 may optionally be connected to a backhaul connection 130, and thereby to other networks (e.g., the Internet). Thus, in addition to providing coordination and control of available system resources (e.g., bandwidth, transmit power, etc.) among the STAs 120, the signboard AP 110 may optionally provide STAs 120 with access to the other networks over the backhaul connection 130.

The signboard AP 110 may generally be a fixed entity (e.g., a roadside sign) that provides notifications or other information to the STAs 120 in its geographic region of coverage. However, the signboard AP 110 may be mobile in some applications (e.g., a moveable signboard). The STAs 120 may generally be mobile. Examples of STAs 120 include a telephone (e.g., cellular telephone), a laptop computer, a desktop computer, a tablet computer, a personal digital assistant (PDA), a digital audio player (e.g., MP3 player), a camera, a game console, a display device, or any other suitable wireless node. The wireless network 100 may be referred to as a wireless local area network (WLAN), and may employ a variety of widely used networking protocols to interconnect nearby devices, such as any member of the Institute of Electrical and Electronics Engineers (IEEE) 802.11 wireless protocol family (referred to as "Wi-Fi"), LTE-Direct, ZigBee®, Bluetooth®, and the like.

As will be described in more detail below, these different entities may be variously configured in accordance with the teachings herein to provide or otherwise support the "smart" signboard-based notifications discussed briefly above. For example, the signboard AP 110 may include a notification management module 112, while one or more of the STAs 120 may include a notification detection module 122 and a notification lookup table 124. The notification detection module 122 may be a hardware or firmware component capable of performing the functionality described herein, or may by an executable software module that, when executed by a processor of the signboard AP 110, causes the signboard AP 110 to perform the functionality described herein. Similarly, the notification detection module 122 may be a hardware or firmware component capable of performing the functionality described herein, or may by an executable software module that, when executed by a processor of the STA 120, causes the STA 120 to perform the functionality described herein. The notification lookup table 124 may include all possible, or at least common, signboard messages (e.g., "wet floor," "slippery when wet," "wet paint," "hard hat area," etc.). The notification lookup table 124 may also include user-defined messages, that is, messages that the user has defined to be displayed instead of or in addition to a particular signboard message. For example, the user may configure the STA 120 to display the warning "watch your step" instead of displaying the warning "slippery when wet."

As noted above, the present disclosure provides a system in which signboards, such as signboard AP 110, are configured to broadcast warning messages or other notifications over a short-range wireless network that uses unlicensed spectrum. Broadly speaking, such notifications can be broadcast in the normal broadcast messages of the broadcast channel for the type of network without an STA 120 having to actually connect to the short-range network in order to receive the notification. For example, each of the above-mentioned short-range network types leaves certain information elements (IEs) in the broadcast channel available for vendor-specific information. As will be described in more detail below, the signboard AP 110 can utilize such IEs to broadcast signboard notifications (such as some or all of the information printed on the signboard), which the STAs 120 can receive and decode without having to connect to the short-range network. Thus, as soon as the STA 120 detects the broadcast channel of a short-range wireless network, the STA 120 can search for any notification information in the broadcast message independently of determining whether or not to connect to the short-range wireless network. If a notification is detected, the STA 120 can alert the user (e.g., by vibrating, playing a warning tone, etc.). Alert modes may be user-configurable (e.g., the user can set whether the STA 120 vibrates or plays an audible alert). The STA 120 can play the alert until the user turns off the alert, indicating that the user had acknowledged the notification.

Figure 2:
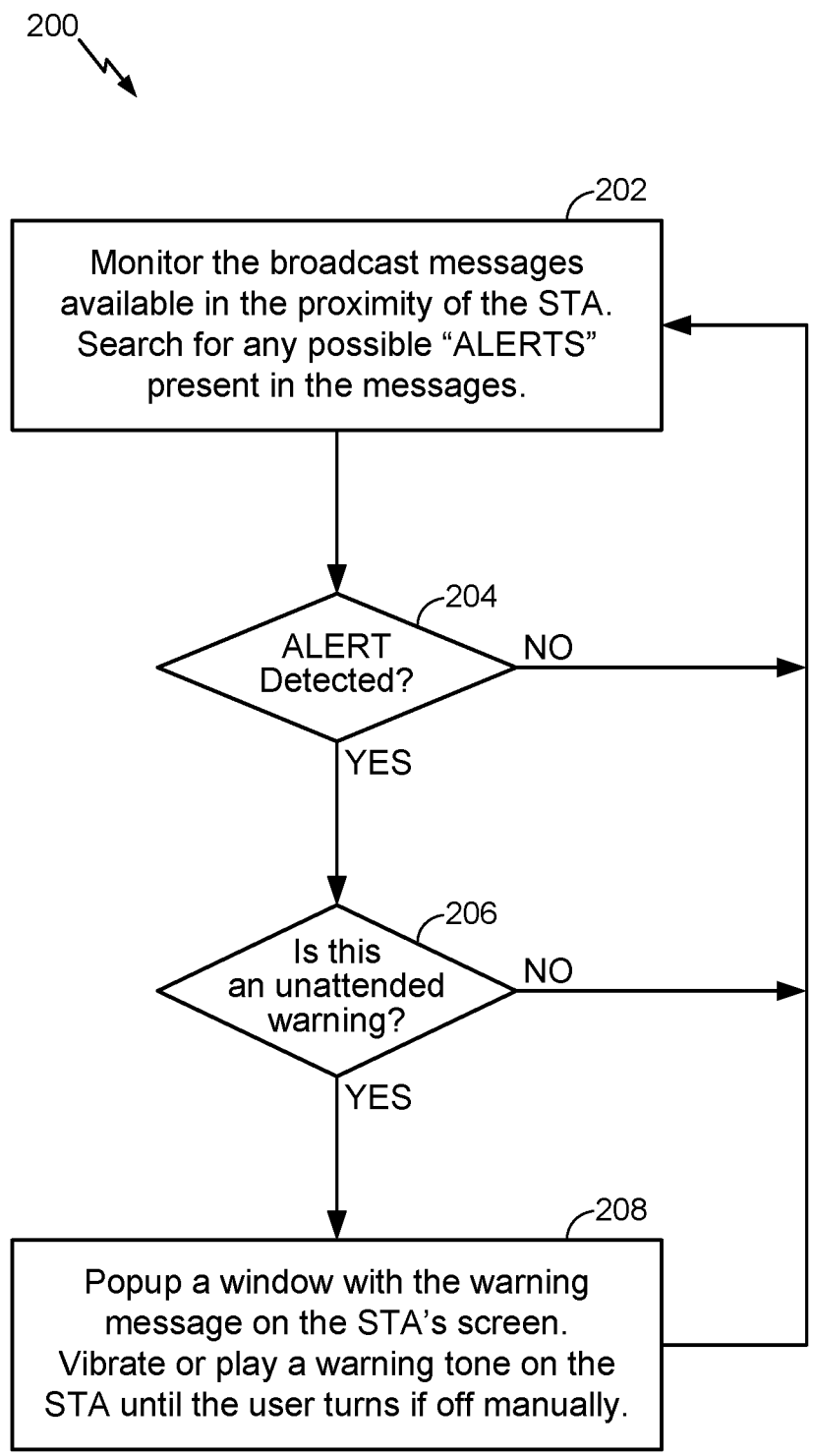
FIG. 2 illustrates an exemplary flow 200 for detecting signboard notifications according to at least one aspect of the disclosure.

FIG. 2 illustrates an exemplary flow 200 for detecting signboard notifications according to at least one aspect of the disclosure. The flow 200 may be performed by an STA 120. More specifically, the flow 200 may be performed by the notification detection module 122, where the notification detection module 122 is a hardware or firmware component, or by execution of the notification detection module 122, where the notification detection module 122 is a software component, causing a processor and/or transceiver of the STA 120 (described further below with reference to FIG. 5) to perform the flow 200. However, for simplicity, the flow 200 is described as being performed by the STA 120.

At 202, the STA 120 monitors (or scans) for broadcast channels transmitted by any signboard APs 110 proximate to the STA 120 (e.g., within communication range of the STA 120) and determines whether or not there are any notifications present in the broadcast messages (e.g., beacon frames in WiFi) of the detected broadcast channel(s). The notification may include some or all of the contents printed on the signboard AP 110. The broadcast channel is typically not the same channel that the STA 120 would use to connect to and communicate with the signboard AP 110.

At 204, if no notifications are present in the detected broadcast channel(s), the flow 200 returns to 202. However, if a notification is detected, then at 206, the STA 120 determines whether or not the notification is an unattended warning. If the notification is not an unattended warning, the flow returns to 202. However, if the notification is an unattended warning, then at 208, the STA 120 displays the notification on a user interface of the STA 120, for example, as a popup window. The STA 120 may also vibrate or play an audible alert until the user dismisses the alert, thereby acknowledging the notification.

The following provides an exemplary implementation of the system described herein utilizing the WiFi protocol (i.e., a short-range wireless network in compliance with IEEE 802.11 standards). WiFi APs broadcast informational "beacon" frames on a broadcast channel in unlicensed spectrum (e.g., the 2.4 GHz or 5 GHz spectrum). The contents of these beacon frames are specified in the Wireless LAN Medium Access Control (MAC) and Physical Layer (PHY) Specifications section of the IEEE 802.11 standard, and include information identifying the WiFi AP and enabling the STA 120 to connect to the WiFi AP. For example, a beacon frame may include a Timestamp information element (IE), a Service Set Identifier (SSID) IE, a Capability Information IE, etc. The last IE of the beacon frame is reserved for vendor-specific information. An STA 120 can read the contents of the beacon frame, including the vendor specific content in the Vendor Specific IE, without establishing a connection with the WiFi AP.

The Vendor Specific IE of a beacon frame is used to carry information that is not defined in the standard, so that reserved fields are not usurped for non-standard purposes, and so that interoperability is more easily achieved in the presence of non-standard information. In the present example, a signboard message in the Vendor Specific field may have the following format:

TABLE 1

Signboard Message Format

| Primary Bitask: Represents the signboard in the broadcast channel | Secondary Bitmask: Index of the lookup table entry representing the signboard content |
|---|---|

The primary bitmask and the secondary bitmask together represent a signboard message in the vendor-specific content of the Vendor Specific IE within a beacon frame. The primary bitmask may be a one-byte bit pattern (e.g., 10101010) that indicates that the beacon frame, or more specifically, the Vendor Specific IE, includes a signboard message. The secondary bitmask may be a two-byte bit pattern that represents an index to a lookup table of all possible, or at least common, signboard caution/warning messages (e.g., notification lookup table 124 in FIG. 1). This is because the two-byte field may not be able to convey the entire warning printed on the signboard. Thus, only the index of a particular message (e.g., "wet floor") is transmitted in the secondary bitmask.

Accordingly, when an STA 120 receives a broadcast channel beacon frame from a WiFi AP, it reads the Vendor Specific IE. Based on reading the primary bitmask, the STA 120 determines that the beacon frame includes a signboard message. Once the STA 120 reads the index value conveyed in the secondary bitmask, it can look up the specific notification message in the notification lookup table and display the corresponding message to the user.

In an aspect, the STA 120 may download the notification lookup table 124 when it downloads the notification detection module 122. In a related aspect, if the STA 120 reads the index value conveyed in the secondary bitmask and there is no corresponding index value in the notification lookup table 124, the STA can connect to the signboard AP 110 to download an entry for the notification lookup table 124 that corresponds to the index value in the secondary bitmask. Alternatively, the STA 120 can connect to the server from which it downloaded the notification detection module 122 and download an update to the notification lookup table 124 that would include an entry for the index value in the secondary bitmask. If needed, the STA 120 can identify the signboard AP 110 to the server based on information in the beacon frame in order to download the appropriate notification lookup table 124 entries.

As will be appreciated, although the foregoing described an exemplary implementation of the system disclosed herein utilizing the WiFi protocol, the above techniques can be extended to other types of short-range wireless networks.

Additionally, although the above disclosure primarily refers to handheld mobile devices and pedestrian signboards, the disclosure is not so limited. Instead, the disclosed system can easily be applied to vehicular notifications along the road. For example, more and more vehicles now include short-range wireless network connectivity (e.g., a Wi-Fi modem). In such an aspect, the vehicle would be an embodiment of the STA 120. Signboards along a roadway can be coupled to a short-range wireless network AP, and these APs can broadcast some or all of the contents of the signboard, as described herein. In such an aspect, the roadside signboard would be an embodiment of the signboard AP 110.

In this scenario, a vehicular STA 120 can monitor broadcast messages (e.g., beacon frames in a WiFi network) transmitted by a roadway signboard AP 110 on the broadcast channel. Upon detecting a notification in the broadcast message, the vehicular STA 120 can display a message to the driver, thereby reducing the likelihood that the driver will miss the warning information printed on the roadway signboard AP 110. Note that the vehicle need not include short-range wireless network connectivity. Rather, the driver's STA 120 may detect the notification in the broadcast message and display the message to the driver.

The "smart" notification concept described herein can be extended to child monitoring systems in home network scenarios. In this aspect, hazardous zones can be marked with smart monitoring boards, which will continuously monitor for a particular signal emitted by a passive short-range wireless network tag (e.g., an Radio Frequency Identifier (RFID) chip, a Near-Field Communication (NFC) tag, etc.) attached to a child's shoes or clothing. When the child comes into proximity of the monitoring board (and therefore the hazardous zone), the monitoring board detects the passive short-range wireless network tag and can transmit a warning message to the home networking system and/or to a caregiver's personal user device indicating that the child is within the hazardous zone.

Figure 3:
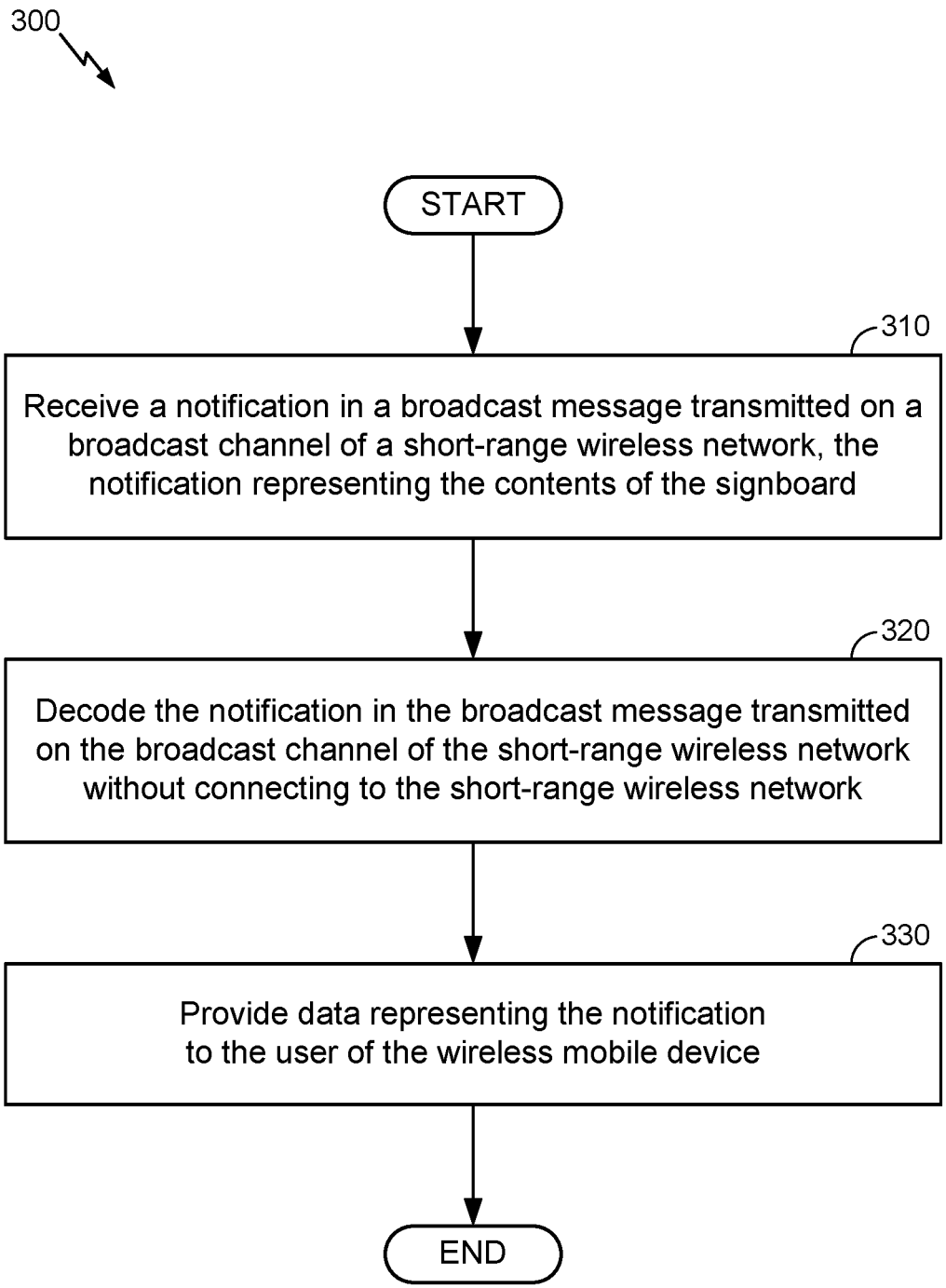
FIG. 3 is a flow diagram illustrating an example method of notifying a user of a wireless mobile device of contents of a signboard.

FIG. 3 is a flow diagram illustrating an example method 300 of notifying a user of a wireless mobile device, such as STA 120, of contents of a signboard, such as signboard AP 110. The method 300 may be performed by, for example, a STA 120. More specifically, the method 300 may be performed by the notification detection module 122, where the notification detection module 122 is a hardware or firmware component, or by execution of the notification detection module 122, where the notification detection module 122 is a software component, causing a processor and/or transceiver of the STA 120 (described further below with reference to FIG. 5) to perform the method 300. However, for simplicity, the method 300 is described as being performed by the STA 120.

At 310, the STA 120 receives a notification in a broadcast message (e.g., a beacon frame in a WiFi network) transmitted on a broadcast channel of a short-range wireless network (e.g., a WiFi network). The notification may represent the contents of the signboard AP 110. At 320, the STA 120 decodes the notification in the broadcast message transmitted on the broadcast channel of the short-range wireless network without connecting to the short-range wireless network. At 330, the STA 120 provides data representing the notification to the user of the STA 120.

Figure 4:
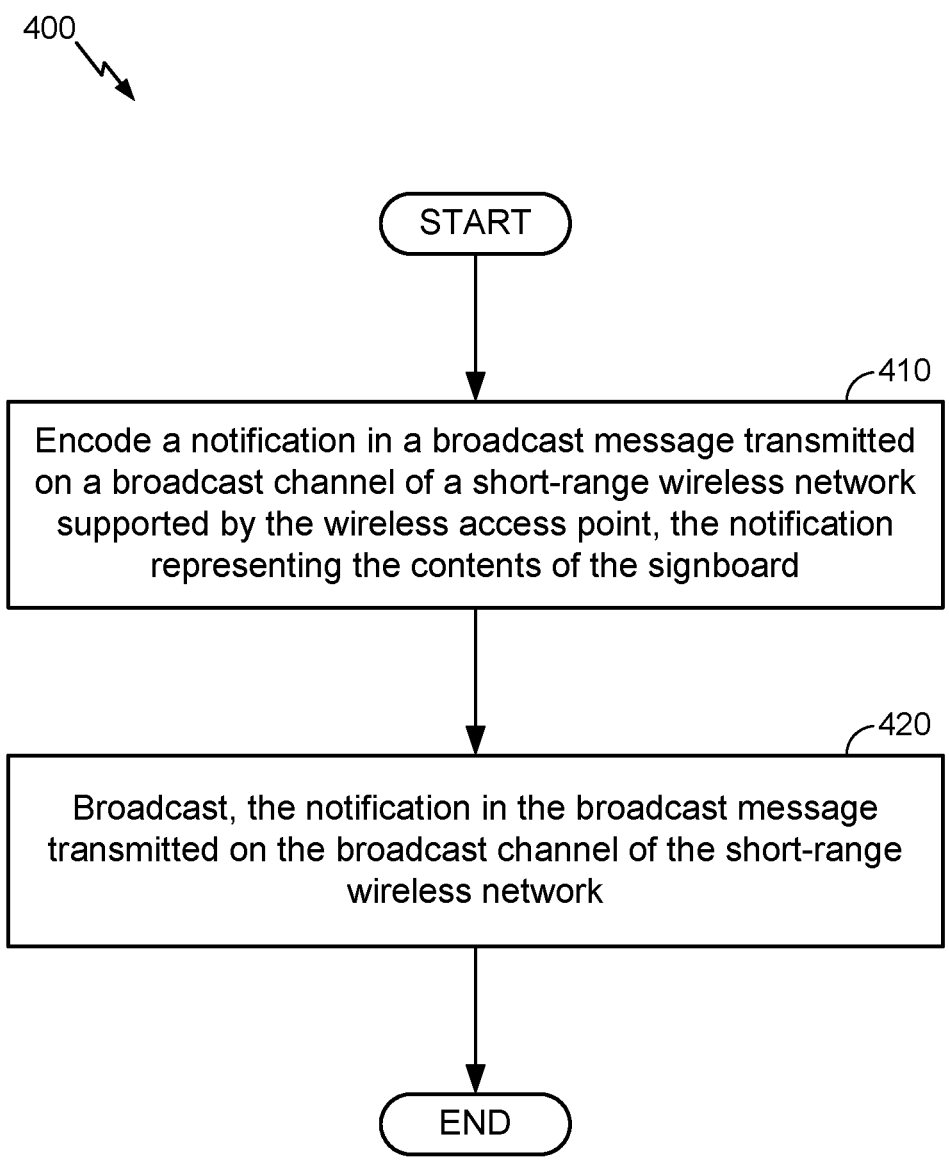
FIG. 4 is a flow diagram illustrating an example method of notifying a wireless mobile device of contents of a signboard.

FIG. 4 is a flow diagram illustrating an example method 400 of notifying a wireless mobile device, such as STA 120, of contents of a signboard, such as signboard AP 110. The method 400 may be performed by, for example, a signboard AP 110. More specifically, the method 400 may be performed by the notification management module 112, where the notification management module 112 is a hardware or firmware component, or by execution of the notification management module 112, where the notification management module 112 is a software component, causing a processor and/or transceiver of the signboard AP 110 (described further below with reference to FIG. 5) to perform the method 400. However, for simplicity, the method 400 is described as being performed by the signboard AP 110.

At 410, the signboard AP 110 encodes a notification in a broadcast message (e.g., a beacon frame in a WiFi network) to be transmitted on a broadcast channel of a short-range wireless network (e.g., a WiFi network) supported by the signboard AP 110. The notification may represent the contents of the signboard coupled to the signboard AP 110. At 420, the signboard AP 110 broadcasts the notification in the broadcast message on the broadcast channel of the short-range wireless network.

Figure 5:
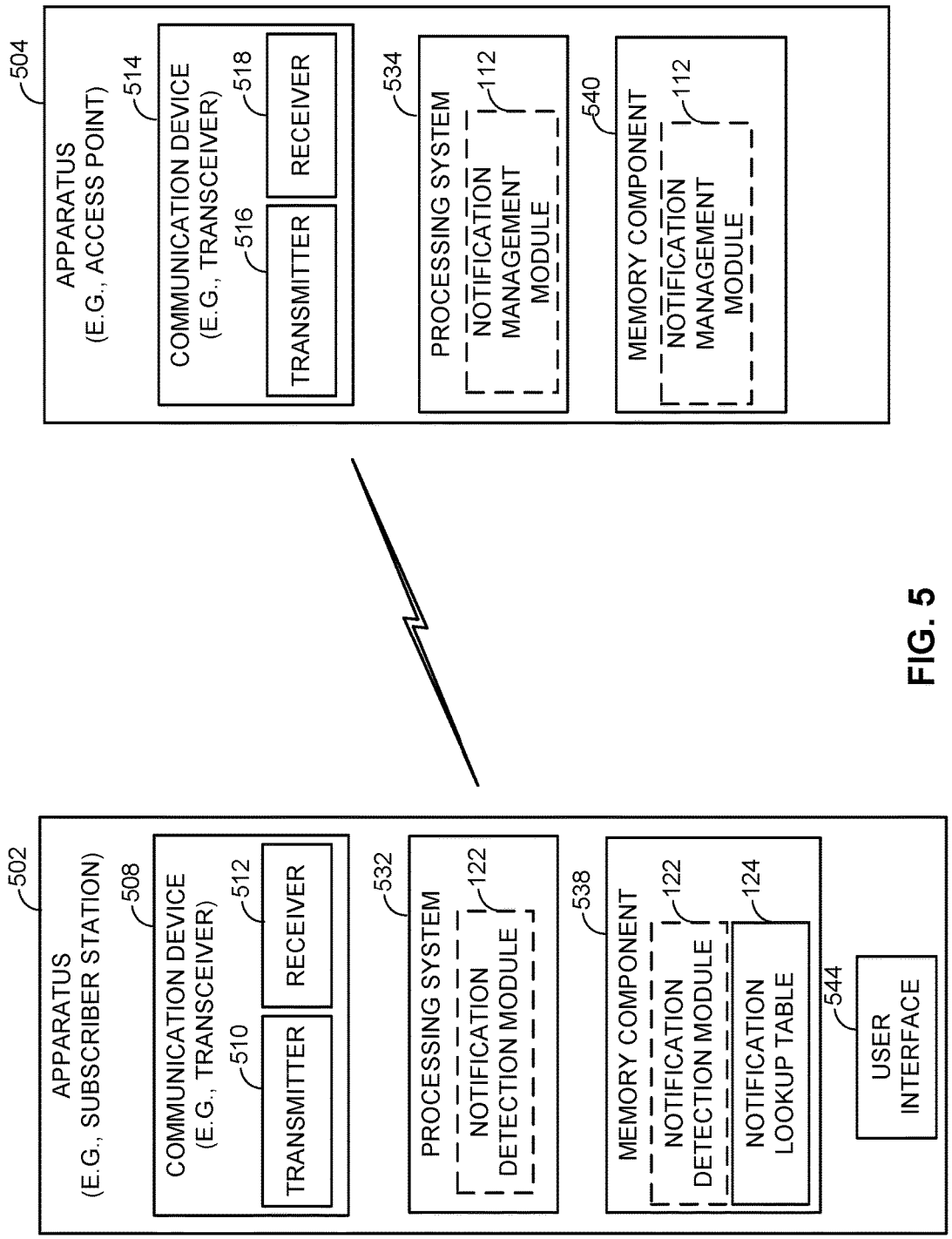
FIG. 5 is a simplified block diagram of several sample aspects of components that may be employed in communication nodes and configured to support communication as taught herein.

FIG. 5 illustrates several sample components (represented by corresponding blocks) that may be incorporated into an apparatus 502 and an apparatus 504 (corresponding to, for example, the STA 120 and the signboard AP 110, respectively) to support the operations as disclosed herein. It will be appreciated that these components may be implemented in different types of apparatuses in different implementations (e.g., in an application-specific integrated circuit (ASIC), in a system-on-chip (SoC), etc.). A given apparatus may contain one or more of the components. For example, an apparatus may include multiple transceiver components that enable the apparatus to operate on multiple carriers and/or communicate via different technologies.

The apparatus 502 and the apparatus 504 each include at least one wireless communication device (represented by the communication devices 508 and 514) for communicating with other nodes via at least one designated radio access technology (RAT). Each communication device 508 includes at least one transmitter (represented by the transmitter 510) for transmitting and encoding signals (e.g., messages, indications, information, and so on) and at least one receiver (represented by the receiver 512) for receiving and decoding signals (e.g., messages, indications, information, pilots, and so on). Similarly, each communication device 514 includes at least one transmitter (represented by the transmitter 516) for transmitting signals (e.g., messages, indications, information, pilots, and so on) and at least one receiver (represented by the receiver 518) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 504 may also comprise a Network Listen Module (NLM) or the like for performing various measurements.

The apparatuses 502 and 504 also include other components that may be used in conjunction with the operations as taught herein. The apparatus 502 includes a processing system 532 for providing functionality relating to, for example, notifying a user of the apparatus 502 of contents of a signboard as taught herein and for providing other processing functionality. More specifically, the processing system 532 may include the notification detection module 122 where the notification detection module 122 is a hardware or firmware component. Alternatively, the processing system 532 may execute the notification detection module 122 where the notification detection module 122 is a software module.

The apparatus 504 includes a processing system 534 for providing functionality relating to, for example, notifying a wireless mobile device, such as apparatus 502, of contents of a signboard as described herein and for providing other processing functionality. More specifically, the processing system 534 may include the notification management module 112 where the notification management module 112 is a hardware or firmware component. Alternatively, the processing system 534 may execute the notification management module 112 where the notification management module 112 is a software module.

The apparatuses 502 and 504 include memory components 538 and 540 (e.g., each including a memory device), respectively, for maintaining information (e.g., information indicative of reserved resources, thresholds, parameters, and so on). Where the notification detection module 122 is a software module, the notification detection module 122 may be stored in the memory component 538. The memory component 538 may additionally store the notification lookup table 124. Where the notification management module 112 is a software module, notification management module 112 may be stored in the memory component 540.

In addition, the apparatus 502 may include a user interface devices 544 for providing indications (e.g., audible and/or visual indications) to a user and/or for receiving user input (e.g., upon user actuation of a sensing device such a keypad, a touch screen, a microphone, and so on).

For convenience, the apparatuses 502 and 504 are shown in FIG. 5 as including various components that may be configured according to the various examples described herein. It will be appreciated, however, that the illustrated blocks may have different functionality in different designs.

The components of FIG. 5 may be implemented in various ways. In some implementations, the components of FIG. 5 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 508, 532, 538, and 544 may be implemented by processor and memory component(s) of the apparatus 502 (e.g., by execution of appropriate code and/or by appropriate configuration of processor components). Similarly, some or all of the functionality represented by blocks 514, 534, and 540 may be implemented by processor and memory component(s) of the apparatus 504 (e.g., by execution of appropriate code and/or by appropriate configuration of processor components).

Figure 6:
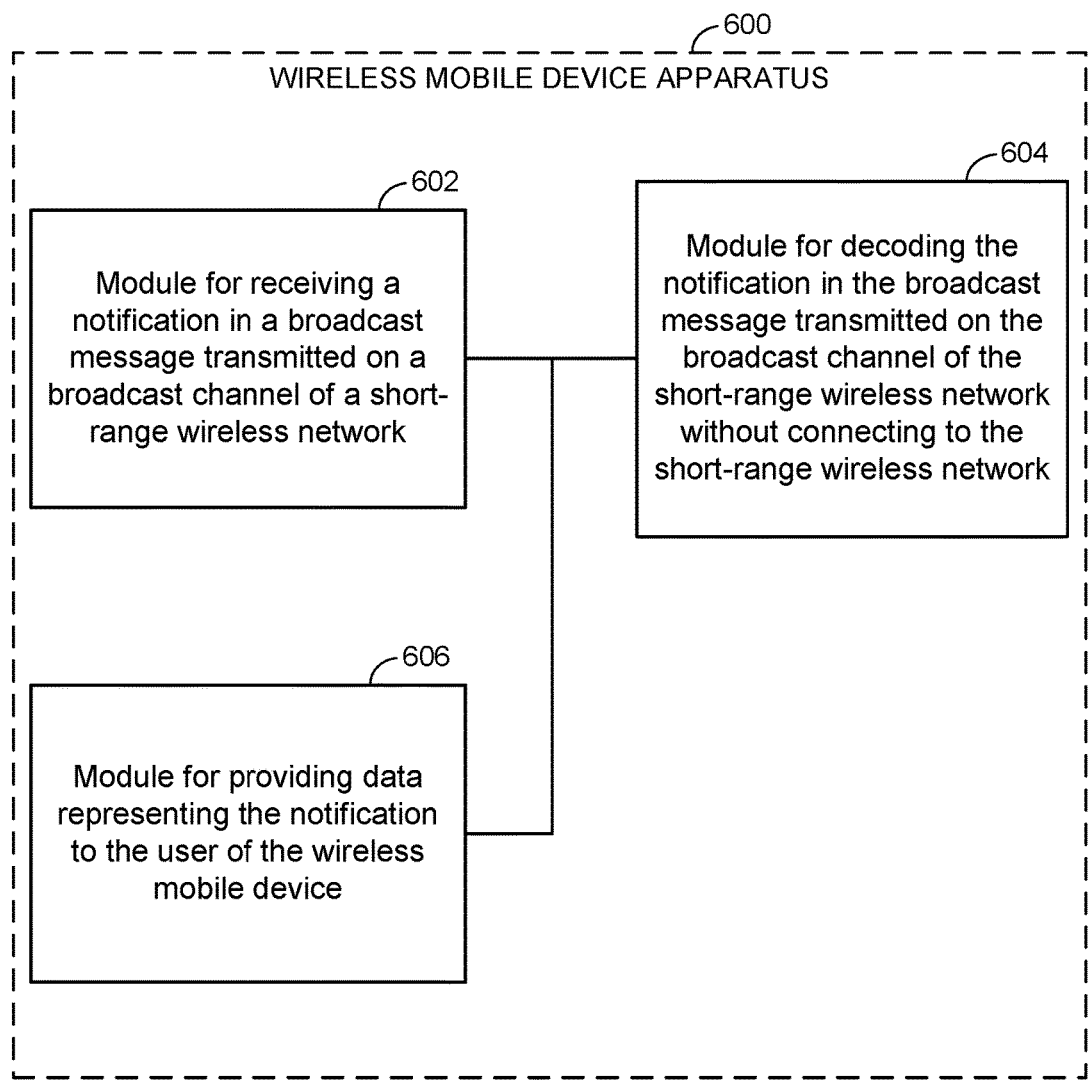
FIGS. 6-7 are other simplified block diagrams of several sample aspects of apparatuses configured to support communication as taught herein.

FIG. 6 illustrates an example wireless mobile device apparatus 600, such as STA 120, represented as a series of interrelated functional modules. A module for receiving 602 may correspond at least in some aspects to, for example, a communication device as discussed herein. A module for decoding 604 may correspond at least in some aspects to, for example, a processing system as discussed herein. A module for providing 606 may correspond at least in some aspects to, for example, a processing system in conjunction with a user interface as discussed herein.

Figure 7:
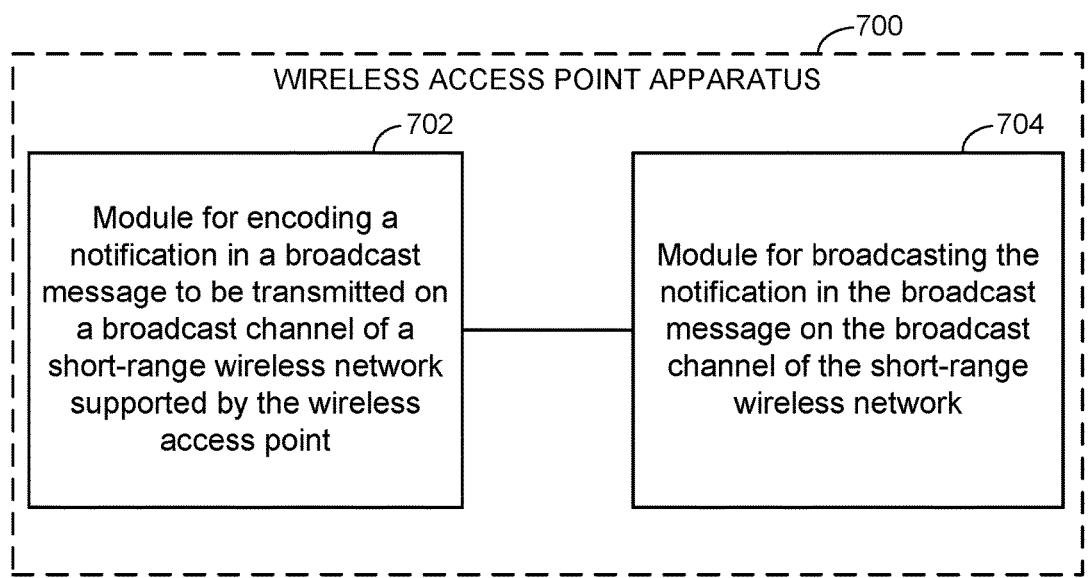

FIG. 7 illustrates an example wireless access point apparatus 700, such as signboard AP 110, represented as a series of interrelated functional modules. A module for encoding 702 may correspond at least in some aspects to, for example, a processing system as discussed herein. A module for broadcasting 704 may correspond at least in some aspects to, for example, a communication device as discussed herein.

The functionality of the modules of FIGS. 6-7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 6-7, as well as other components and functions described herein, may be implemented using any suitable means. Such means also may be implemented, at least in part, using corresponding structure as taught herein. For example, the components described above in conjunction with the "module for" components of FIGS. 6-7 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for notifying a user of a wireless mobile device of contents of a signboard.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of notifying a user of a wireless mobile device of contents of a signboard, comprising:
    downloading, by the wireless mobile device, a lookup table of signboard warning messages;
    receiving, at the wireless mobile device, a notification in a vendor-specific information element of a broadcast message transmitted on a broadcast channel of a short-range wireless network, wherein the vendor-specific information element is reserved for conveying information other than information defined by a short-range wireless network standard, wherein the vendor-specific information element includes a primary bitmask indicating that the notification is included in the broadcast message and a secondary bitmask representing an index to the lookup table of signboard warning messages, and wherein an entry in the lookup table corresponding to the index represents the contents of the signboard;
    decoding, by the wireless mobile device, the notification in the broadcast message transmitted on the broadcast channel of the short-range wireless network without connecting to the short-range wireless network; and
    providing, by the wireless mobile device, data representing the notification to the user of the wireless mobile device based on the entry in the lookup table corresponding to the index.

2. The method of claim 1, wherein information identifying an access point supporting the short-range wireless network and information to enable the wireless mobile device to connect to the short-range wireless network is transmitted on the broadcast channel.

3. The method of claim 1, wherein the providing comprises:
    displaying the data representing the notification on a user interface of the wireless mobile device; and
    playing an audible or tactile alert to alert the user that the data representing the notification is being displayed.

4. The method of claim 3, wherein the audible or tactile alert is played until a dismissal of the data representing the notification is received on the user interface.

5. The method of claim 1, wherein the short-range wireless network uses unlicensed spectrum.

6. The method of claim 1, wherein the short-range wireless network is a wireless local area network (WLAN), a personal area network (PAN), or a peer-to-peer (P2P) network.

7. A method of notifying a wireless mobile device of contents of a signboard, comprising:
    encoding, by a wireless access point coupled to the signboard, a notification in a vendor-specific information element of a broadcast message to be transmitted on a broadcast channel of a short-range wireless network supported by the wireless access point, wherein the vendor-specific information element is reserved for conveying information other than information defined by a short-range wireless network standard, wherein the vendor-specific information element includes a primary bitmask indicating that the notification is included in the broadcast message and a secondary bitmask representing an index to a lookup table of signboard warning messages on the wireless mobile device, and wherein an entry in the lookup table corresponding to the index represents the contents of the signboard; and
    broadcasting, by the wireless access point, the notification in the broadcast message on the broadcast channel of the short-range wireless network,
    wherein the notification being broadcast in the broadcast message transmitted on the broadcast channel of the short-range wireless network enables the wireless mobile device to decode the notification without connecting to the short-range wireless network.

8. The method of claim 7, wherein information identifying the wireless access point and information to enable the wireless mobile device to connect to the short-range wireless network is transmitted on the broadcast channel.

9. The method of claim 7, wherein the short-range wireless network uses unlicensed spectrum.

10. The method of claim 7, wherein the short-range wireless network is a wireless local area network (WLAN), a personal area network (PAN), or a peer-to-peer (P2P) network.

11. An apparatus for notifying a user of a wireless mobile device of contents of a signboard, comprising:
a transceiver of the wireless mobile device configured to download a lookup table of signboard warning messages and receive a notification in a vendor-specific information element of a broadcast message transmitted on a broadcast channel of a short-range wireless network, wherein the vendor-specific information element is reserved for conveying information other than information defined by a short-range wireless network standard, wherein the vendor-specific information element includes a primary bitmask indicating that the notification is included in the broadcast message and a secondary bitmask representing an index to the lookup table of signboard warning messages, and wherein an entry in the lookup table corresponding to the index represents the contents of the signboard;
at least one processor of the wireless mobile device configured to decode the notification in the broadcast message transmitted on the broadcast channel of the short-range wireless network without connecting to the short-range wireless network; and
a user interface of the wireless mobile device configured to provide data representing the notification to the user of the wireless mobile device based on the entry in the lookup table corresponding to the index.

12. The apparatus of claim 11, wherein the user interface being configured to provide comprises the user interface being configured to:
display the data representing the notification on a user interface of the wireless mobile device; and
play an audible or tactile alert to alert the user that the data representing the notification is being displayed.

13. The apparatus of claim 12, wherein the audible or tactile alert is played until a dismissal of the data representing the notification is received on the user interface.

14. An apparatus for notifying a wireless mobile device of contents of a signboard, comprising:
at least one processor of a wireless access point coupled to the signboard configured to encode a notification in a vendor-specific information element of a broadcast message to be transmitted on a broadcast channel of a short-range wireless network supported by the wireless access point, wherein the vendor-specific information element is reserved for conveying information other than information defined by a short-range wireless network standard, wherein the vendor-specific information element includes a primary bitmask indicating that the notification is included in the broadcast message and a secondary bitmask representing an index to a lookup table of signboard warning messages on the wireless mobile device, and wherein an entry in the lookup table corresponding to the index represents the contents of the signboard; and
a transceiver of the wireless access point configured to broadcast the notification in the broadcast message on the broadcast channel of the short-range wireless network,
wherein the notification being broadcast in the broadcast message transmitted on the broadcast channel of the short-range wireless network enables the wireless mobile device to decode the notification without connecting to the short-range wireless network.

15. The apparatus of claim 14, wherein information identifying the wireless access point and information to enable the wireless mobile device to connect to the short-range wireless network is transmitted on the broadcast channel.

16. The apparatus of claim 14, wherein the short-range wireless network uses unlicensed spectrum.

\* \* \* \* \*